Jan. 5, 1932. W. C. TROUT 1,840,066
WALKING BEAM
Filed Nov. 1, 1930
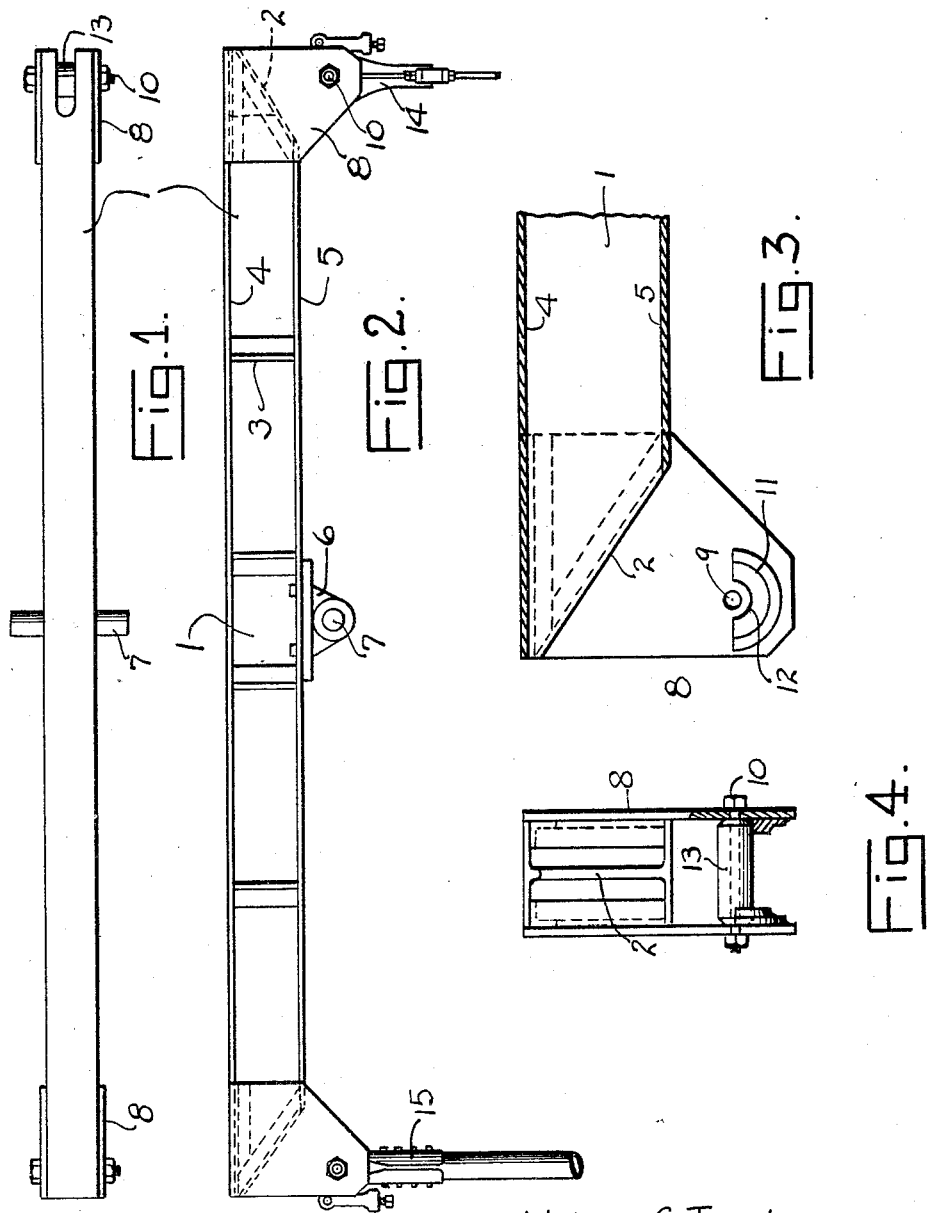
Walter C. Trout Inventor
By Jesse R. Stone
Lester B. Clark
Attorney Patented Jan. 5, 1932

1,840,066

UNITED STATES PATENT OFFICE

WALTER C. TROUT, OF LUFKIN, TEXAS

WALKING BEAM

Application filed November 1, 1930. Serial No. 492,736.

My invention relates to an improvement in walking beams such as are employed in deep well operations in pumping or standard tool drilling.

It is an object of the invention to provide a walking beam of strong and sturdy construction and which may be easily formed from ordinary structural steel.

It is another object of the invention to provide an attachment at the ends of the beam whereby the same may be connected either to a pitman or to a rod hanger, as the case may be, in the operation of the beam.

The invention consists also in the particular arrangement whereby the operating member, either the pitman or the rod connection, may be pivoted to a walking beam in an expeditious manner and with a strong and substantial support.

In the drawings herewith, Fig. 1 is a top plan view of a walking beam embodying my invention.

Fig. 2 is a side elevation thereof.

Fig. 3 is a longitudinal section through the end of the beam showing the inner side of one of the plates.

Fig. 4 is an end view of the beam, the lower righthand portion being in section.

The beam which I employ is preferably of I-beam construction. Said beam 1 is formed of the proper length and adjacent the ends thereof the lower side is beveled upwardly as indicated in dotted lines at 2. Between the ends the beam is reenforced at intervals by transverse members 3 of angle iron or similar structural steel fitting between the upper web 4 and the lower web 5 of the beam. I have shown two of these closely adjacent the center of the beam and above the bearing plate 6, which has the laterally extending trunnions 7 thereon, by means of which the beam may be supported for rocking upon the Sampson post, not shown.

At the ends of the beam I secure by welding or otherwise two opposite plates 8. Said plates are squared at their upper ends to fit against the side of the beam and the lower end is beveled forwardly and extends below the level of the beam. These two plates are set directly opposite each other and have openings 9 therethrough to receive a bolt 10.

Immediately below the openings 9 in the plates I form a bearing socket 11. The form of socket shown is a semi-circular member welded to the inner side of the plate 8 so that the upper recess 12 may form a socket to receive a bearing sleeve 13. Said bearing sleeve, as shown in Fig. 4, is of the proper length to fit between the two side plates 8 and has a longitudinal opening to receive the bolt 10 by means of which said sleeve is secured in position supported within the bearing sockets 12.

It will be noted that I have formed plates 8 with the bearing members thereon at each end of the beam and it is to be noted that the bearing sleeve 13 may form a support for a rod hanger shown at 14 in Fig. 2, or it may serve as a pitman bearing for the pitman 15 at the opposite end of the beam.

Therefore, a beam constructed in this manner has at either end a strong and substantial bearing whereby attachment may be made between the beam and any ordinary operative device connected therewith.

My walking beam is exceedingly simple in construction but is strong and adapted to undergo the heavy strains to which such beams are subjected and has a substantial bearing whereby connections may be made thereto with a minimum of difficulty. The invention resides in the extreme simplicity and strength of the beam and its ready adjustability for any ordinary use.

What I claim as new is:

1. A walking beam including an I-beam, a rock shaft midway of the ends thereof, means transversely of said beam to reenforce the same, end plates secured to said beam on opposite sides and depending below the lower side thereof, said plates having openings therein to receive a transverse bearing bolt, a bolt therein, a bearing on said bolt, and means on said plates to support said bearing.

2. A walking beam including an I-beam, a rock shaft midway of the ends thereof, means transversely of said beam to reenforce the same, end plates secured to said beam on opposite sides and depending below the lower side thereof, said plates having openings therein to receive a transverse bearing bolt, a bolt therein, a bearing on said bolt, and means on said plates to support said bearing comprising upwardly presented semi-circular seats formed rigidly on said plates.

3. A walking beam including an I-beam, a rock shaft midway of the ends thereof, means transversely of said beam to reenforce the same, end plates secured to said beam on opposite sides and depending below the lower side thereof, said plates having openings therein to receive a transverse bearing bolt, a bolt therein, said bolts being below the lower side of said beam, sockets formed on the inner sides of said beam, a bearing member journalled in said sockets, and means to retain said bearing member in position therein.

4. A walking beam of structural steel, a pair of plates secured to the sides of said beam at each end thereof and projecting below said beam, socket members formed rigidly on the inner sides of said plates, a bolt connecting said plates and a bearing sleeve on said bolt supported in said socket members.

5. An I-beam having its ends tapered upwardly, a pair of plates on each side of the tapered ends, said plates depending below said beam, bearing sockets formed on the inner sides of said plates below said beam, a bearing sleeve in said sockets, and a transverse bolt through said sleeve.

In testimony whereof I hereunto affix my signature this 27th day of October, A. D. 1930.

WALTER C. TROUT.